United States Patent [19]

Holbert

[11] E Re. 28,909

[45] Reissued July 20, 1976

[54] CONVEYOR

[75] Inventor: Dimitry Holbert, Birmingham, Mich.

[73] Assignee: Standard Alliance Industries, Inc., Chicago, Ill.

[22] Filed: July 18, 1974

[21] Appl. No.: 489,798

Related U.S. Patent Documents

Reissue of:

[64] Patent No.: 3,678,861
Issued: July 25, 1972
Appl. No.: 63,392
Filed: Aug. 13, 1970

[52] U.S. Cl. ..... 104/172 B; 198/137; 198/181

[51] Int. Cl.[2] ..... B61B 13/00

[58] Field of Search ..... 104/172 R, 172 B, 172 BT, 104/172 C, 172 S, 178, 25; 198/203, 181, 182, 189, 137, 168, 164

[56] References Cited

UNITED STATES PATENTS

| | | | |
|---|---|---|---|
| 802,047 | 10/1905 | Krell | 198/203 |
| 1,706,905 | 3/1929 | Stockly | 198/203 |
| 2,642,176 | 6/1953 | De Burgh | 198/203 X |
| 2,685,361 | 8/1954 | Garman | 198/181 |
| 3,435,780 | 4/1969 | Czarnecki et al. | 104/172 C |
| 3,590,745 | 7/1971 | Ouska | 104/172 B |

*Primary Examiner*—Robert J. Spar
*Assistant Examiner*—Randolph A. Reese
*Attorney, Agent, or Firm*—Harness, Dickey & Pierce

[57] ABSTRACT

A conveyor chain for conveyor cars and the like having a plurality of rollers for engagement with guide rails for the chain and a plurality of members carried by the chain having at least one substantially flat surface extending laterally of the chain adapted to be engaged by a chain driving member.

12 Claims, 5 Drawing Figures

CONVEYOR

Matter enclosed in heavy brackets [ ] appears in the original patent but forms no part of this reissue specification; matter printed in italics indicates the additions made by reissue.

BACKGROUND AND SUMMARY OF THE INVENTION

This invention relates generally to conveyor chains for conveyor systems, for example, for a system like that disclosed in the patent to Czarnecki et al, U.S. Pat. No. 3,435,780, issued Apr. 1, 1969, and assigned to the assignee of this application. As shown in the above patent, conveyor chains are conventionally driven by driving members disposed on opposite sides of the chain which engage the arcuate surfaces of rollers carried by the chain. In some installations, for example, in foundries where the conveyor assembly may carry heavy molds between various levels of the foundry, very large driving forces are required to move the conveyor assembly. With large driving forces, the arcuate surfaces of the rollers develop laterally-outward forces tending to spread the driving members. In addition to the above undesirable tendency, the force of the driving members against the rollers is generally detrimental to the life of the bearings for the rollers. As a still additional disadvantage, the rollers must be sufficiently large in diameter to extend laterally outwardly of the driving members to provide a substantial surface component which is crosswise of the chain to efficiently receive the force of the driving members. As a result, the rollers tend to engage the guides for the chain during chording of the chain when a curved path of relatively small radius is negotiated.

The present invention solves the above problems by providing a laterally extending driven member or block on the chain which has flat surfaces disposed crosswise of the chain for engagement by the driving members of the drive means. Accordingly, substantially no laterally-outward forces are developed, and consequently, there is no tendency to spread the driving members. Furthermore, since the crosswise flat surfaces of the driven members may readily extend to the lateral extremities of the driven members, the driven members may be constructed with a lesser extension laterally of the chain than rollers used for this purpose so as to avoid engagement of the driven members with the guide rails of the chain during chording of the chain as it negotiates a curved path. Additionally, the bearings for the rollers no longer receive the driving force thereby providing increased roller bearing life. Preferably, the driven members are pivotally mounted to the chain so as to accommodate any angular misalignment between the driving members and driven members. Also, preferably, the driven members are mounted intermediate the pivot for the chain so that they may be removed for replacement or repair without dismantling of the chain.

In view of the above and the following detailed description of the preferred embodiment of this invention, it will be appreciated that the improved conveyor chain provided by this invention is a significant advance in this art.

DETAILED DESCRIPTION OF THE PREFERRED EMBODIMENT

Figures 1, 2, 3:
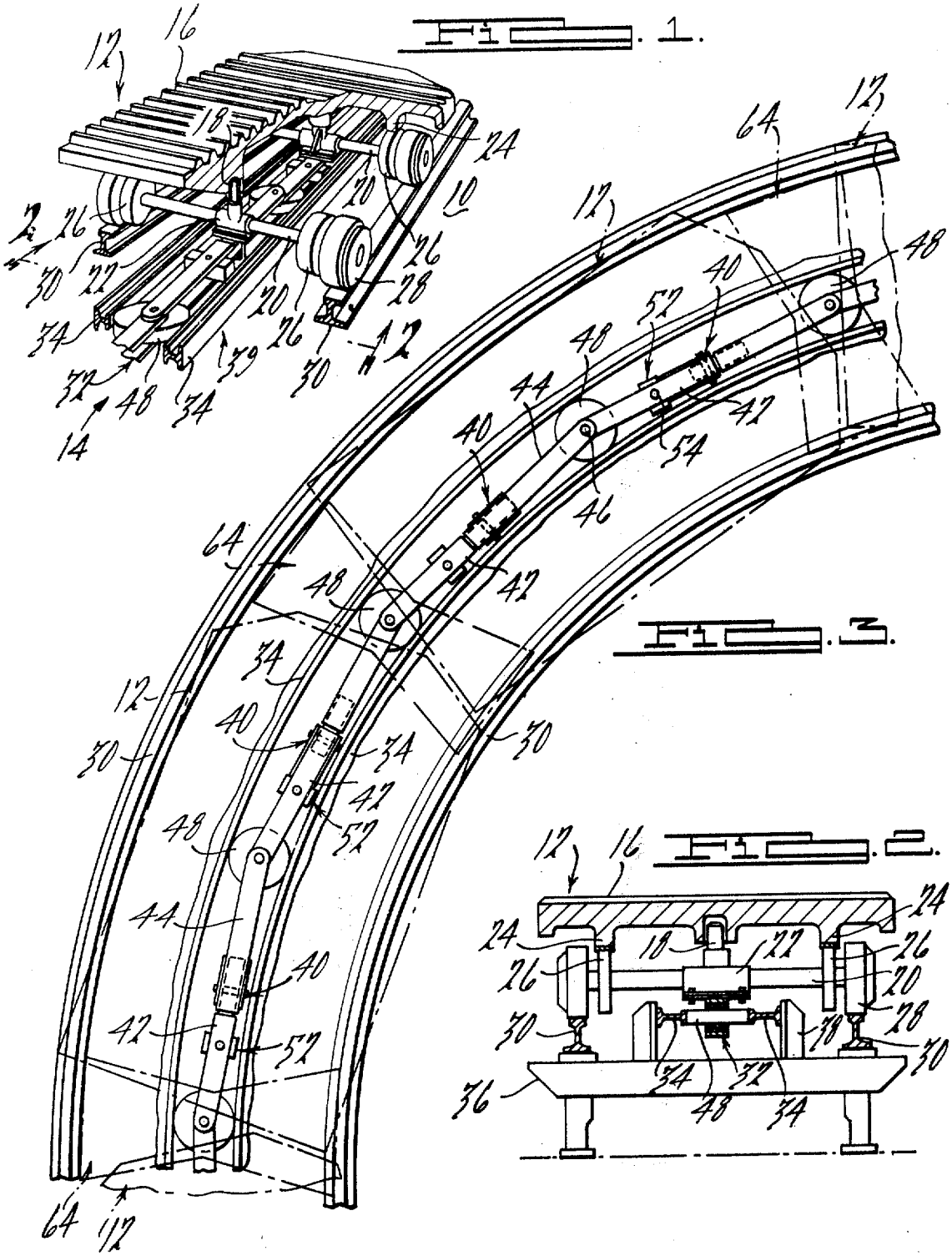
FIG. 1 is a perspective illustration of a mold car driven by an exemplary conveyor chain construction according to this invention.
FIG. 2 is an end cross-sectional view of the mold car and conveyor chain construction shown in FIG. 1.
FIG. 3 is a top view illustrating the manner in which the conveyor chain construction of FIG. 1 negotiates a curved path.

In FIG. 1, an exemplary conveyor car and conveyor chain assembly is shown generally designated 10 which is suitable for use, for example, in a foundry for conveying molds to various molding operation locations. The assembly 10 may include a conveyor car generally indicated at 12 and a conveyor chain assembly generally indicated at 14. The conveyor cars 12 may comprise a top 16 on which conveyable articles are carried, for example, the molds for a molding operation. The car tops 16 are mounted on king pins 18 which are connected to the axles 20 by means of T-connectors 22. The car top 16, in addition to being mounted on the king pins 18, is also supported by downwardly extending flanges 24 which support the car top 16 on four bolster wheels 26. The bolster wheels 26 are free wheeling on the axle 20 and there is normally relative movement between the bolster wheels 26 and the flanges 24 only when the conveyor car 12 is negotiating turns. The conveyor car 12 moves along a path taken by the conveyor system by rolling on wheels 28 which are guided along a roadway or track for the conveyor car 12 consisting of a pair of rails 30. A chain 32, *comprising pivotally interconnected pairs of links is* guided along a path provided by a pair of *vertical* rails 34, *and* drives or propels the cars 12 along the path defined by the rails 30. The rails 30 may be mounted on a bed 36 while the rails 34 may be mounted on vertical extensions 38.

Figure 5:
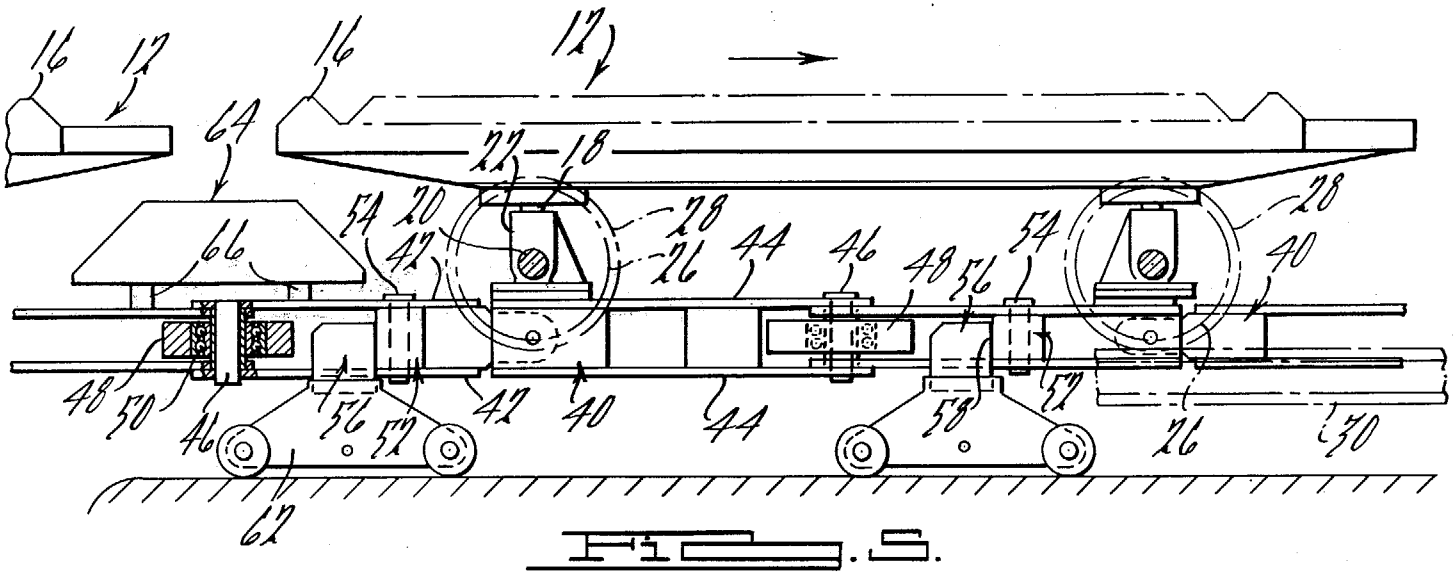
FIG. 5 is a side view, partially in section, illustrating the mold car and conveyor chain construction of FIG. 1 showing the manner of engagement of the chain with driving dogs of a drive means for the conveyor chain.

The T-connector 22 is removably secured to *the conveyor chain 32 at* a [ pivotal ] *universal* joint 40 *which comprises a part* of the chain 32 [ which ] *and* provides for vertical articulation of the chain when the path defined by the rails 30 changes upwardly or downwardly. [ The ] *In the form of the invention here shown, a* universal joint 40 generally [ connects vertically spaced pairs ] *is provided midway between the ends of each pair* of chain links. *It will be observed that the two links of each pair are spaced vertically apart and are formed of two separate left and right portions* 42 and 44 *of substantially equal length, as perhaps best shown in FIG. 5. In each instance, the left hand portions 42 are welded or otherwise fixedly connected at the inner ends thereof to one end portion of the universal joints 40 and the right hand portions 44 are similarly welded at the inner ends thereof to the other end portion of the universal joints. At the outer ends thereof, the left and right link portions 42 and 44* [ which pairs ] are pivotally connected by pins 46 to adjacent *similar and* complementary [ pins ] *pairs* of links [ 42 or 44 ]. The pins 46 provide for horizontal articulation of the chain 32 when the guide rails 30 bend leftwardly or rightwardly in the horizontal plane, [ or ] *viz, in* a plane parallel to the car top 16. The pins 46 also carry rotatably mounted rollers 48 which *space the outer end portions of the upper and lower links of the chain 32 and* are preferably mounted by bearings 50 as illustrated in FIG. 5. In the general arrangement as shown, a roller 48 is mounted intermediate each pair of adjacent conveyor cars 12 as well as centrally of each conveyor car 12.

Figure 4:
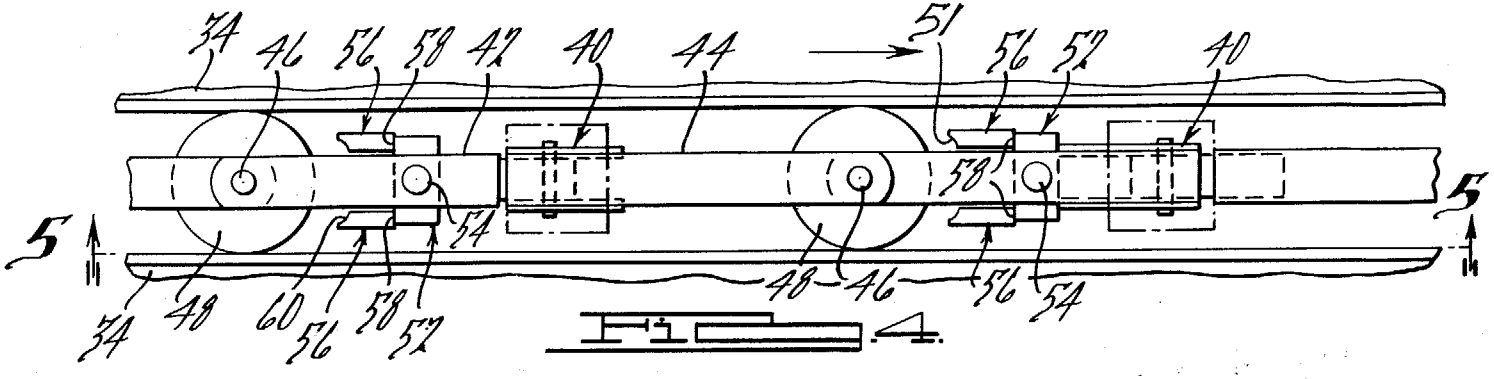
FIG. 4 is a top view of a conveyor chain construction of FIG. 1 showing the manner of engagement of the chain with driving dogs of a drive means for the conveyor chain.

Rectangular blocks 52 are carried by the chain 32 between the [ links ] *link portions* 42 [ and ] *adjacent to a universal joint 40 and between the universal joint and an adjacent roller 48. The drive blocks 52* extend laterally [ thereof, ] *of the chain 32* and are preferably mounted for limited [ rotation ] *pivotal movement* in a horizontal plane as by pins 54 extending through the [ links ] *link portions* 42 and the blocks 52. The blocks 52 are disposed a predetermined distance [ forward ] *forwardly* of the nearest roller 48 so as to accommodate an upward arcuate movement of a pair of driving dogs or members 56 of a *conventional* driving apparatus, only partially shown in FIG. 5. As can be best seen in FIG. 4, *each pair of driving dogs 56 straddle the chain 32, and each* [ *the blocks* ] *block* 52 [ have ] *has* a pair of flat surfaces 58, [ each extending ] *which extend* laterally from [ one side ] *opposite sides* of the *chain* links [ 42 ] and [ being ] *are* adapted to *be engaged by correspondingly* [ *engage a corresponding* ] flat [ surface ] *surfaces* on a driving dog 56. It will be appreciated that *if the blocks are pivotally mounted on the pins 54 in the preferred manner* any angular misalignment between the flat surfaces [ on ] *of* the dogs 56 and the driven blocks 52 are accommodated by pivotal movement of the blocks 52 about [ pivot ] *pivots* 54. Thus, the driving force provided by the driving dogs 56 is transmitted to the chain 32 through the pivot pins 54. The [ rearward ] *rearwardly* facing surfaces [ 50 ] *51* of the driving dogs 56 may be arcuate in cross section so as to be adapted to fully engage the arcuate surfaces of the nearest rearward roller 48 [ upon ] *which functions also as a hold back dog to limit* coasting of the chain 32 after driving movement of the dogs 56 has ceased [ to limit such coasting movement of the chain 32 ] thereby facilitating relatively accurate positioning of the cars 12. As can be best seen in FIG. 3, the blocks 52 extend laterally of the chain links 42 a distance less than the lateral extension of the rollers 48 so as to prevent engagement of the blocks 52 with the rails 34 during chording of the chain 32 as it negotiates a curved path. The blocks 52 may have a lesser lateral extension than a roller used for this purpose since it provides a continuous crosswise surface to its lateral extremities while a roller used for this purpose has only a slight crosswise surface component near its lateral extremities, and accordingly, must be made correspondingly larger in diameter to provide a suitable engaging surface for the driving members. In the general arrangement of the conveyor as shown, each of the driven blocks 52 is positioned intermediate a pair of rollers 48, and particularly, between a roller 48 and a vertical articulation point 40.

As can be best seen in FIG. 5, the driving dogs 56 are *conventionally* mounted on rolling carriages 62 which are driven by a *caterpillar* chain and motor assembly, for example, as illustrated in the aforementioned patent to Czarnecki et al, U.S. Pat. No. 3,435,780.

In one of its intended uses, the cars 12 carry sand molds for a foundry operation. To prevent any spilled sand from interfering with the bearings 50 and the rollers 48, a sand shield 64 is mounted intermediate the cars as by pins or studs 66 extending from the chain links 42 and 44 into receptacles in the sand shield 64 as shown. To accommodate the relative angular motion of the chain links 42 and 44 when the chain 32 negotiates a curved path, the receptacle for one of the pins 66 may be slotted or elongated. The sand shield 64 preferably slopes laterally as shown to deflect the sand to the sides of the conveyor 10. It may also have fore and aft bevels or slopes, if desired.

In view of the above description of an exemplary conveyor system 10 according to this invention, it will now be appreciated that an efficient driving engagement is provided between the drive dogs 56 and the driven blocks 52. Moreover, the bearings 50 supporting the rollers 48 are not carrying the driving forces, and therefore, are only forcibly loaded upon engagement of the rollers 48 with the guide rails 34 when negotiating a curved path and occasionally when the rollers 48 engage the guide rails 34 when the conveyor chain 32 is transversing a straight path. Accordingly, the service [ lie ] *life* of the bearings 50 is benefitted. In addition to the above advantages, the driven blocks 52 may be easily removed for repair or replacement without dismantling the chain 32. It will be appreciated that this is a significant advantage as the difference in elevation between the different levels of a foundry may exert a force on the chain preventing convenient assembly of the chain after dismantling.

While it will be apparent that the teachings herein are well calculated to teach one skilled in the art the method of making the preferred embodiment of this invention, it will be appreciated that the invention is susceptible to modification, variation and change without departing from the proper scope or meaning of the subjoined claims.

What is claimed is:

1. In a conveyor chain assembly, a chain comprising connected pairs of spaced links, curved guide rails on opposite sides of said chain, a plurality of rollers carried by pins connected between said pairs of links and engageable with said guide rails as said chain passes therethrough, whereby intermediate portions of said links between said rollers will approach relatively closely to said guide rails, means for driving said conveyor chain assembly comprising a plurality of blocks disposed between said pairs of links, each block having a pair of planar surfaces extending laterally outwardly in opposite directions from said links, the extent of said surfaces being less than that which will cause engagement of said blocks with said guide rails during the chain assembly movement means for mounting said blocks for limited rotation with respect to said links at intermediate portions thereof between said guide rollers, and a forked driving apparatus having a pair of driving dogs movable into position on opposite sides of a pair of links with lateral planar surfaces engageable with the lateral surfaces on said blocks.

2. A conveyor chain assembly according to claim 1 wherein said chain is pivotally connected for vertical articulation intermediate said rollers.

3. A conveyor chain assembly according to claim 1 further including a plurality of conveyor cars carried by said chain.

4. A conveyor chain assembly according to claim 3 wherein said conveyor cars are serially mounted to said chain with one of said rollers intermediate adjacent ones of said conveyor cars.

5. A conveyor chain assembly according to claim 4 including a shield mounted intermediate said cars adapted to deflect material falling from said conveyor cars from said rollers intermediate said adjacent ones of said conveyor cars.

*6. In a conveyor chain assembly, a chain comprising connected pairs of spaced links; curved guide rails on opposite sides of said chain; a plurality of rollers carried by pins connecting said pairs of links and engageable with said guide rails as said chain passes therebetween, whereby intermediate portions of said links between said rollers approach relatively closely to said guide rails; and means for driving said chain comprising a plurality of blocks spaced along the length of said chain, each block being disposed between and attached to the links of a pair of said chain links and having planar surfaces extending laterally outwardly in opposite directions from said links, said rollers following and being disposed adjacent to but spaced from respective of said blocks, the lateral extent of said surfaces being less than that which will cause engagement of said blocks with said guide rails during operation of said chain assembly, and a driving apparatus having pairs of forked driving dogs movable into position on opposite sides of said chain, said dogs having lateral planar surfaces engageable with the lateral surfaces of said blocks.*

*7. In a conveyor chain assembly, a chain adapted to move along a predetermined path and comprising pairs of spaced links arranged in end-to-end relation; means including pins interconnecting said pairs of links; curved guide rails alongside said chain at curved sections of said predetermined path; antifriction rollers mounted on said pins adapted to ride on said guide rails as said chain negotiates said curved sections in use, portions of said links between said rollers approaching relatively closely to said guide rails due to chording of the links as the rollers move on said guide rails; blocks connected to at least certain of said pairs of links, each of said blocks being disposed ahead of and adjacent to but spaced from a respective one of said rollers and said blocks having planar surfaces extending laterally outwardly in opposite directions from said links, the lateral extent of said planar surfaces being less than that which will cause engagement of said blocks with said guide rails in the operation of said chain assembly; and a driving apparatus coactive with said chain to move the same under power along said predetermined path, said apparatus having pairs of driving dogs, each pair of dogs disposed to straddle said chain behind one of said blocks and being engageable with the planar surfaces of said block.*

*8. In a conveyor chain assembly, a chain comprising a plurality of links arranged in pairs and connected end-to-end by means including pivots; rollers on said pivots; curved guide rails coactive with said rollers to control the path of movement of said chain in use; intermediate portions of said links between said rollers approaching relatively closely to said guide rails in use; and means for driving said conveyor chain comprising a plurality of blocks spaced along the length of said chain, each block being attached to links of said chain ahead of and adjacent to but spaced from a respective one of said rollers, said blocks having planar surfaces extending laterally outwardly in opposite directions from said links, the lateral extent of said surfaces being less than that which will cause engagement of said blocks with said guide rails during operation of said chain assembly; and a drive apparatus having pairs of driving dogs, each pair of dogs adapted in operation of said drive to straddle said chain between one of said blocks and the adjacent roller and being provided with lateral planar surfaces engageable during said operation with the planar surfaces of said block, said dogs when in driving position against said blocks being spaced from the adjacent rollers but operative to be engaged by said rollers to limit over-travel and coasting of said chain during certain operating conditions of said conveyor chain assembly.*

*9. A conveyor chain assembly adapted to travel between guide rails at least certain portions of which are curved, said chain assembly comprising pairs of spaced links having overlapping end portions; pins interconnecting the overlapping end portions of said links; rollers mounted for rotation on said pins extending laterally of said links for rolling engagement with said guide rails and operative to hold the portions of said links between said rollers free from engagement with said rails; means for driving said conveyor chain comprising a plurality of blocks disposed between and connected to at least certain of said links and having planar driving surfaces extending laterally outwardly in opposite directions from said links, said rollers following and being disposed adjacent to but spaced from said blocks, the length of said blocks and the lateral extent of said driving surfaces being less than that which will cause engagement of said blocks with said guide rails during operation of said chain assembly; and a forked driving apparatus having pairs of driving dogs movable into position on opposite sides of said chain and engageable with the planar driving surface of said blocks.*

*10. In a chain conveyor of the type having an endless chain; means for guiding said chain through a predetermined path of travel including laterally spaced guide rails along curved sections of said path on opposite sides of said chain and rollers carried by and extending laterally from opposite sides of said chain engageable with said guide rails; and a power drive for said chain having a plurality of spaced forked driving elements arranged to straddle said chain, the improvement comprising a plurality of blocks carried by said chain and having portions thereof extending laterally in opposite directions from said chain, said blocks being disposed ahead of and adjacent to but spaced from respective of said rollers, said blocks being spaced along the chain for engagement by said forked driving elements and said laterally extending portions having transverse planar surfaces on which said elements seat, said rollers extending laterally from the chain sufficiently farther than said blocks to hold the latter free from engagement with said guide rails.*

*11. The combination as set forth in claim 10 wherein said rollers define holdback means engageable with the forked elements to limit coasting of said chain under certain operating conditions of said conveyor.*

*12. In a chain conveyor of the type having an endless chain; means for guiding said chain through a predetermined path of travel having opposed, laterally spaced, vertical guide surfaces along curved sections of said path and rollers carried by and extending laterally from opposite sides of said chain engageable with said guide surfaces; and a power drive for said chain having a plurality of spaced forked driving elements arranged to straddle said chain, the improvement comprising a plurality of*

*blocks carried by and having portions thereof extending laterally in opposite directions from said chain, said blocks being disposed ahead of and adjacent to but spaced from respective of said rollers, said driving elements being operative to move progressively into position behind successive blocks for driving engagement with the latter and said blocks having planar rear surfaces disposed substantially transversely of said chain against*

*which said elements seat to drive the chain, said rollers extending laterally from the chain sufficiently farther than said blocks to hold the latter free from engagement with said guide surfaces, and said following rollers being engageable with said forked driving elements to limit over-travel and coasting of said chain.*

* * * * *